May 16, 1967 W. B. ISAACS, JR., ET AL 3,319,941
METHOD AND MIXING APPARATUS
Original Filed Jan. 12, 1965 5 Sheets-Sheet 1

INVENTOR
WILLIAM BRUCE ISAACS, JR.
BY W. E. Sherwood
ATTORNEY

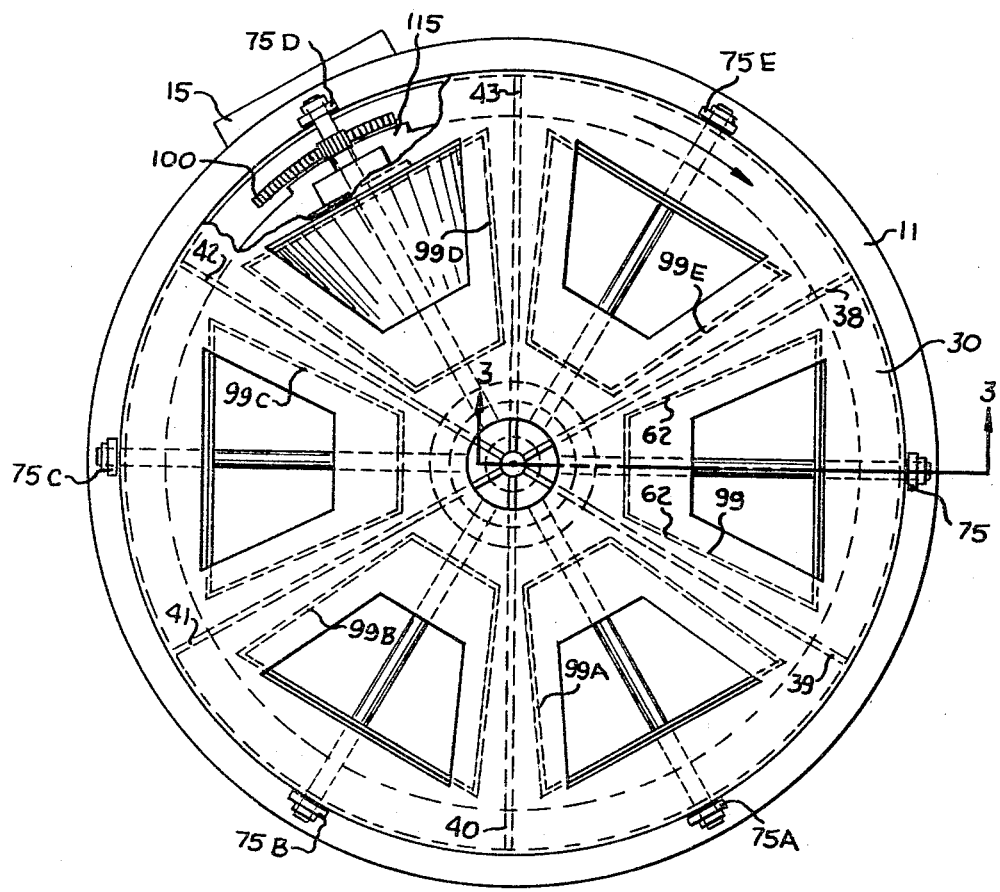

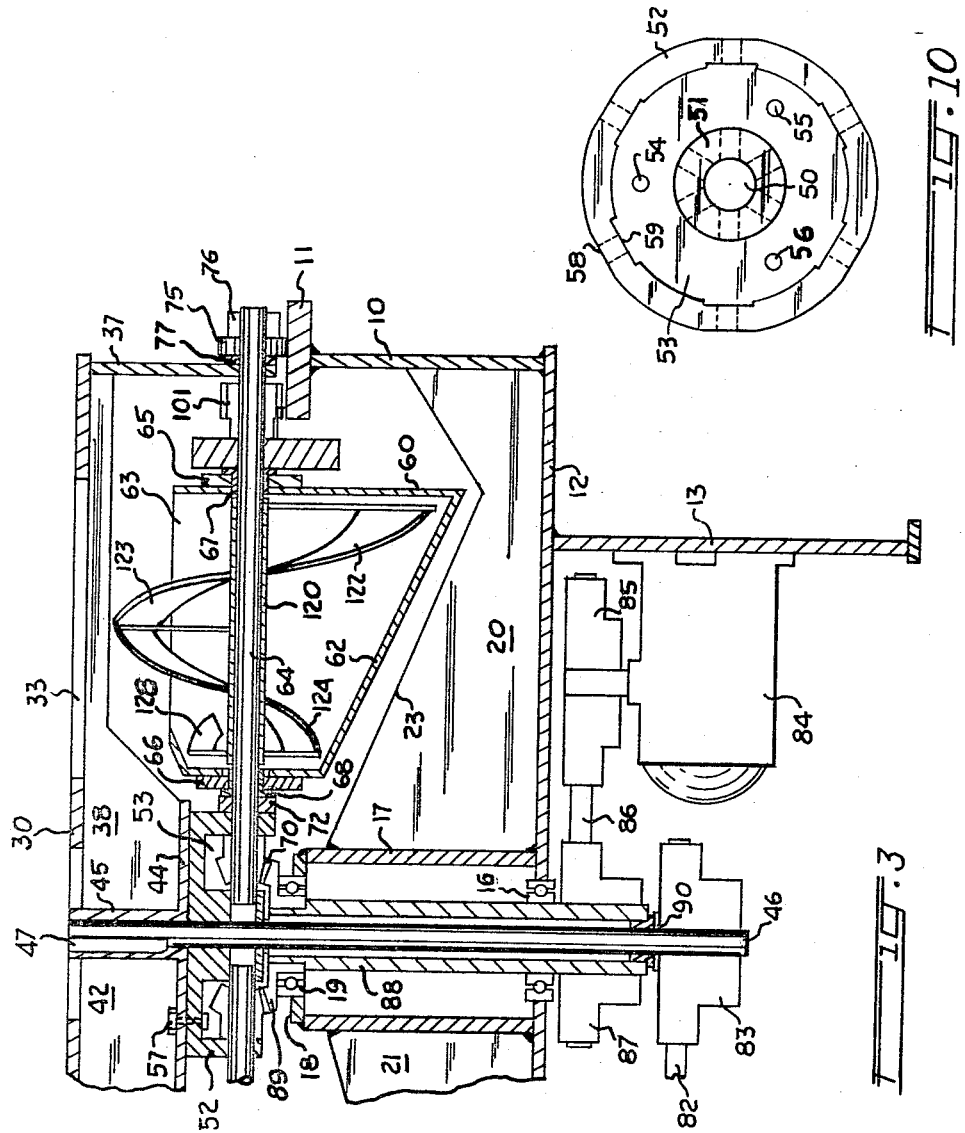

May 16, 1967 W. B. ISAACS, JR., ETAL 3,319,941
METHOD AND MIXING APPARATUS
Original Filed Jan. 12, 1965 5 Sheets-Sheet 4
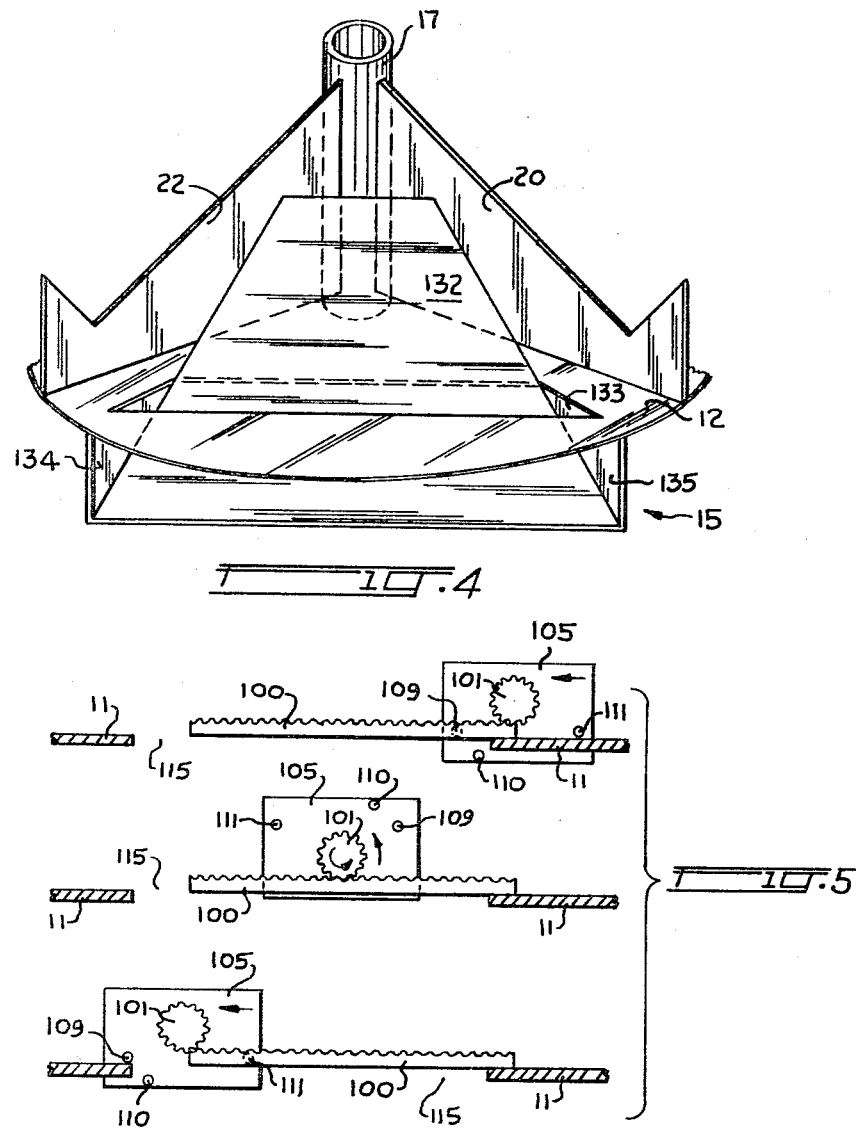
INVENTOR
WILLIAM BRUCE ISAACS, JR.
BY W.E. Sherwood
ATTORNEY

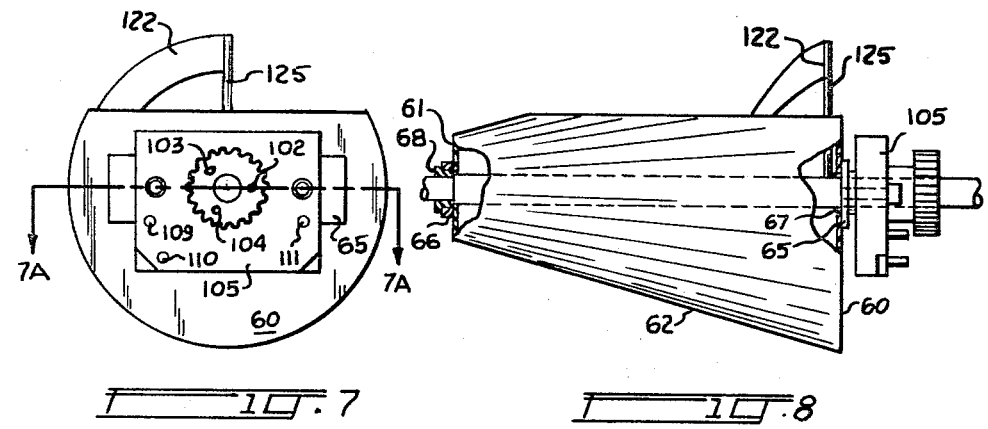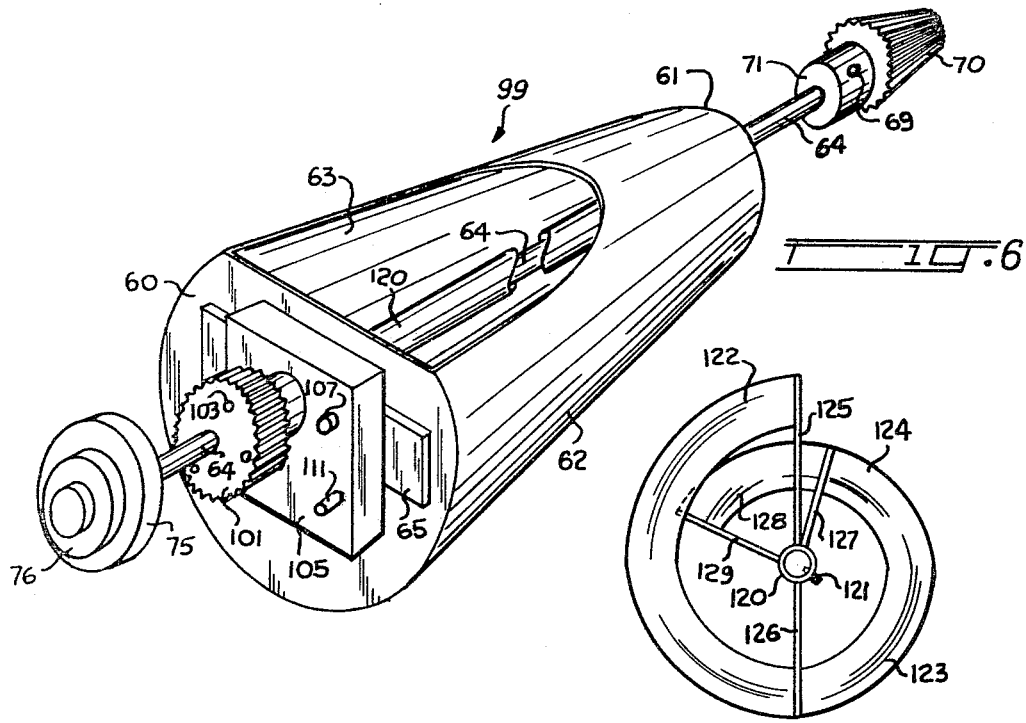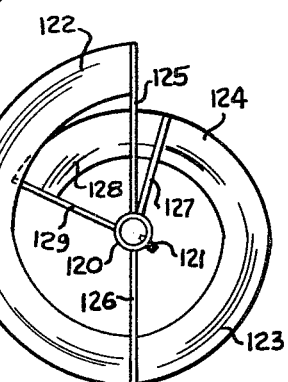

United States Patent Office 3,319,941
Patented May 16, 1967

3,319,941
METHOD AND MIXING APPARATUS
William Bruce Isaacs, Jr., Lexington, Ky., and Roger G. Heaton, Cincinnati, Ohio, assignors to Machinery Development Company, Cincinnati, Ohio, a corporation of Ohio
Continuation of application Ser. No. 425,033, Jan. 12, 1965. This application May 20, 1966, Ser. No. 554,633
24 Claims. (Cl. 259—161)

This application is a continuation of copending application Ser. No. 425,033, filed Jan. 12, 1965, now abandoned.

This invention relates to a new and improved mixing apparatus and more particularly to an apparatus in which the throughput of material and the degree of mixing of such material may be readily controlled.

The equipment embodying the invention may be employed for the mixing of many diverse materials under atmospheric pressure. For purposes of illustration the invention is described in connection with the practice of a concrete mixing process, but as will be understood, it is not to be considered as being limited to the mixing of any particular materials. In a heavy-duty mixing operation, such as found in the mixing of concrete or heavy slurries, massive mixing chambers and drive means frequently are required, and when such chambers need to be brought to rest for filling, or for emptying, the power requirements are appreciable. The mounting of such mixing chambers also requires massive structures and often prevents the use within a compact space of a machine which has a large throughput of material. It is these and other characteristic limitations of conventional mixing apparatus which it is a purpose of my invention to overcome.

An object of the invention is to provide an improved mixing apparatus in which the mixing of a plurality of batches of material proceeds simultaneously and with a substantially continuous discharge and loading taking place in the apparatus as a whole.

Another object is to provide a mixing apparatus having a plurality of batch type mixing chambers in which the degree of mixing of materials therein can be readily controlled.

Another object is to provide a mixing apparatus having a plurality of batch type mixing chambers and in which the throughput of material through the apparatus can be readily controlled.

Another object is to provide a mixing apparatus having a plurality of batch-type mixing chambers arranged in compact relation to each other and supported in a rotatable housing having a common drive means for the several mixing chambers.

A further object is to provide a large capacity mixing apparatus having relatively low power requirements.

A further object is to provide a mixing apparatus having a plurality of invertible open top mixing chambers arranged for rapid loading and discharge.

A further object is to provide an improved mixing chamber of generally truncated conical form adapted for rapid and complete unloading and requiring no discharge valve or gate to be associated therewith.

A still further object is to provide a mixing apparatus having substantially all of its driving elements shielded against damage, and which apparatus is less likely to injure an operator thereof.

A still further object is to provide a mixing apparatus which can be readily assembled or disassembled.

Other objects and advantages will become more apparent as the description proceeds and when considered in conjunction with the accompanying drawings in which:

FIG. 2 is a top plan view of the rotatable housing, with parts broken away, and with the blades removed, and showing a means for inverting the chambers at a discharge station.

FIG. 3 is a sectional view to a larger scale taken on line 3—3 of FIG. 2 and with parts shown in elevation for clarity.

FIG. 4 is a perspective view of a portion of the frame at the discharge station.

FIG. 5 is a diagrammatic view showing the relation of the chamber-indexing structure and chamber-inverting means at three sequential positions.

FIG. 6 is a perspective view of a mixing chamber with the mixing blade removed.

FIG. 7 is an end view of the mixing chamber showing the blade in its uppermost position.

FIG. 8 is a side view of the chamber showing end shaft seals and with the blade in the position of FIG. 7.

FIG. 9 is an end view of the mixing blade, and

FIG. 10 is a bottom plan view of the central mixer-shaft hanger.

Figures 1, 7A:
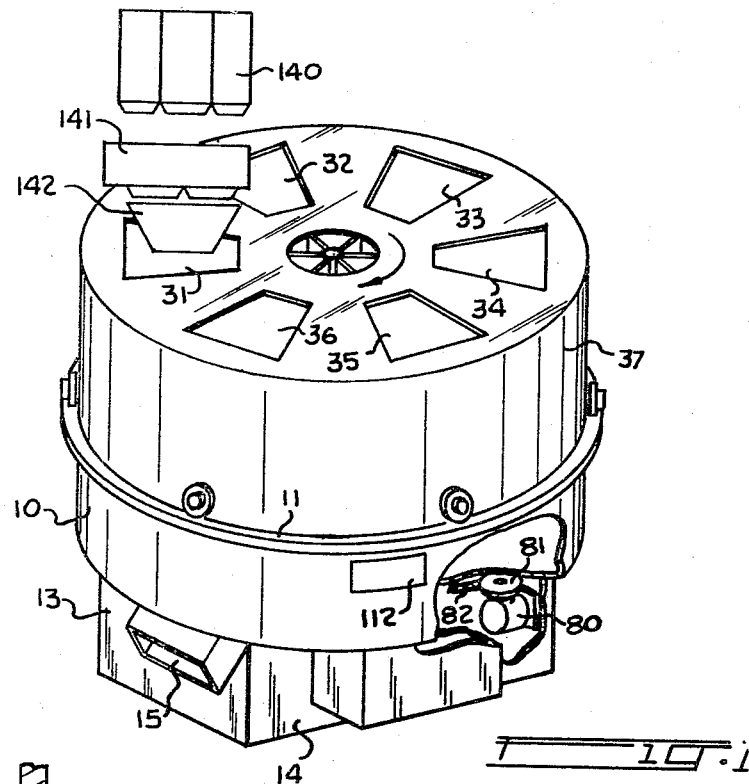
FIG. 1 is a perspective view of the mixing apparatus, with parts broken away, and showing loading, and discharge equipment associated therewith.
FIG. 7A is a sectional view to a larger scale taken on line 7A—7A of FIG. 7 and showing the mounting of the several parts attached to the invertible mixing chamber with the shaft removed.

Referring first to FIG. 1, one embodiment in which the invention may conveniently be employed comprises a central mixing plant for concrete mixes and in which a stationary frame having an elevated cylindrical side wall 10 with a horizontal ledge 11 at its upper periphery is provided. As shown in FIGS. 3 and 4 the frame includes an elevated circular floor plate 12 attached to the lower periphery of the wall 10 and supported in turn upon depending lower walls or legs 13, 14. Preferably these lower walls, with access entries therethrough, form a complete enclosure for the motors later to be described and are of a height adequate to support the discharge chute 15 of the apparatus at a suitable elevation for use with trucks, conveyors or the like which are employed to carry away the mixed materials.

At its center the floor plate is formed with an opening receiving a first shaft-bearing 16 and attached to the plate 12 in surrounding relation to this opening is an upwardly disposed tube 17 having an annular plate 18 at the upper end thereof for supporting a second shaft-bearing 19. Extending radially from the center tube 17 is a plurality of symmetrically spaced reinforcing webs, three of which are shown at 20, 21, 22. These webs are rigidly attached to each of the tube 17, the floor 12, and the cylindrical wall 10, thus to provide rigidity to the frame and to assist it in supporting the rolling loads of the mixing chambers later to be described. The inclined upper edges 23 of the several webs are located so as to provide a slight clearance with the wall of these mixing chambers as they move around the frame in their upright positions.

As a feature of the invention we provide a generally circular rotatable housing having an upper plate 30 containing a plurality of fan-shaped apertures 31 to 36 inclusive, for use in loading of the mixing chambers and corresponding to the number of such chambers contained in the apparatus. The plate 30 has rigidly attached thereto a peripheral downwardly extending wall member 37, herein defined as the outer mixer-shaft hanger and rigidly attached to the underside of the plate and to the inner surface 9 of the wall member is a plurality of circumferentially spaced, radially extending, reinforcing webs 38 to 43 inclusive (FIG. 2). At their inner ends these webs are rigidly affixed to an annular mounting plate 44 having a short upwardly extending tube 45 rigidly affixed thereto and within which tube the main drive shaft 46 is located. A suitable key and slot arrangement indicated at 47 and permitting ready disassembly of the housing from the drive shaft is provided for detachably joining that housing and shaft.

Rigidly attached to the underside of mounting plate 44 is a central mixer-shaft hanger best shown in FIGS. 3 and 10 and including a central opening 50 for receiving the drive shaft 46, an inner annular wall 51 having sockets therein for receiving the inner ends of the respective mixer shafts, and an outer annular wall 52 having bores therein through which those mixer shafts pass and with machined flat surfaces 58 and 59 on the wall 52 at the ends of the bores therein. Between the annular walls a generous sized annular recess 53 is formed having a size adequate to receive the pinion gears of the respective mixer shafts. A series of bolt-receiving holes 54 to 56 also are formed in the upper wall of the hanger and through which the assembly bolts, one of which is seen at 57 in FIG. 3, are passed in order to join the hanger detachably to the mounting plate 44. As will thus be seen, the housing and its attached hangers thus form a reinforced bridging element covering the entire top of the stationary frame, and serving as the structure from which the several mixing chambers 99 to 99E, inclusive, are suspended, as now to be described.

As best shown in FIGS. 6 to 8, each of the mixing chambers has a generally truncated conical shape including a first or outer end wall 60, a second or inner end wall 61 of smaller size and an arcuate side wall 62 having an aperture 63 of substantial size located therein and with the end wall 60 forming part of the boundary of that aperture. The overall size of the chamber is such that its side wall 62 will be disposed closely adjacent the reinforcing webs on the underside of the housing, as shown for example by the dotted line position of the chamber 99 mounted between webs 38 and 39 in FIG. 2. In accordance with the invention, a minimum of three equal-sized mixing chambers (each subtending an angle of about 120°) is employed (although a greater number is generally employed, as, for example, the six equal-sized chambers herein shown (with each subtending an angle of about 60°)) in order to achieve a thorough mixing and a rapid loading and unloading of the apparatus. In any event, however, a very substantial percentage of the area lying beneath the housing is devoted to mixing operations and a compact structure with a large through-put capacity of material is made available to the user.

At the axis of the conical shape of each chamber an opening is provided in the respective end walls for receiving a mixer shaft 64. These end walls have rigidly affixed to the exterior surfaces of the same a pair of apertured reinforcing blocks 65 and 66 through which the shaft passes in journalled relation to a pair of bearings 67 and 68 serving as seals and retained within the respective blocks. Adjacent its inner end the shaft has detachably affixed thereto, as by a pin 69 (FIG. 6), a pinion gear 70 having an integral collar 71 adapted to bear against the flat surface 59 of the central hanger. In addition, an apertured spacer 72 is interposed between the flat surface 58 of the central hanger and the bearing 68 thus to prevent longitudinal movement of the mixer shaft during normal operation.

Adjacent the outer end of the mixer shaft a wheel 75 is rotatably mounted thereon at a location corresponding to the location of the ledge 11 of the frame, and such wheel is retained in place by a suitable retainer 76 attached to the shaft. Inboard of the wheel the shaft is adapted, when in assembled position as seen in FIG. 3, to be journalled in a suitable aperture in wall 37 or other form of outer mixer-shaft hanger, of the rotatable housing. An apertured spacer 77 interposed between the wheel and the hanger wall further serves to prevent longitudinal shaft movement and to position the wheel properly.

As thus far described, it now will be evident that the several wheels 75 to 75D, inclusive, as shown in FIG. 2, serve to support the housing for rotational movement on the ledge of the frame. Moreover, the mixing chambers and their contents are suspended from the hangers on the lower side of the housing and the nature of the upper portion of the housing is such as to act as a bridge between the wheels located on diametrically opposite sides of the housing and to distribute the loading on the several wheels.

Passing now to FIGS. 1 and 3, a motor 80 suitably mounted within the lower wall space of the frame is provided with a pulley 81 around which is trained a chain 82 or the like. This chain serves to drive pulley 83 which is keyed to the lower end of the main drive shaft 46 and which in turn serves to rotate the above-described housing. In addition, a second motor 84 is suitably mounted within the frame and has a pulley 85 around which a chain 86 or the like drives a pulley 87 attached to hollow shaft 88. The shaft 88 serves to drive all of the mixer shafts 64 simultaneously and for this purpose a main gear 89 is keyed to the upper end of hollow shaft 88. Gear 89 has an aperture in the center thereof through which shaft 46 passes. The hollow shaft 88 is rotatably journalled in the bearings 16 and 19 which are supported upon the stationary frame, and a hollow thrust bearing 90 is interposed between the upper surface of pulley 83 and the lower end of shaft 88. As will be apparent, with the several mixing shafts 64 being thus suspended from the hangers of the housing, the pinion gears 70 on those shafts are adapted to engage with the main gear 89 without application of the weight of the mixing chambers and their contents upon the bearing contact between the teeth of the engaged gears. The power consumption, as well as the size, of motor 84 thus is reduced. Concomitantly, the weight of the rotatable housing and of the mixing chambers and their contents serve a flywheel action after once being set in motion and the power consumption, as well as the size of motor 80 likewise is reduced. Normally, the mixing apparatus of the invention will run for long periods of uninterrupted mixing and the relative slow start-up of the apparatus, due to this flywheel effect, is of no significance.

Referring now to FIGS. 5 to 8, an arrangement is provided for inverting the mixing chambers seriatim as they pass the discharge station for the apparatus and for restoring them to upright position when they reach an adjacent station. This arrangement may take various forms without departing from the invention, and in the form disclosed herein comprises a rack 100 serving as a first chamber-inverting means which is mounted upon the upper surface of ledge 11 for cooperation with a second chamber-inverting means in the form of a pinion gear 101 journalled for rotation about mixing shaft 64 of the above described mixing chamber.

This gear is rigidly fastened as by removable pins 102, 103 and 104 to a massive chamber-positioning member 105 having a boss or spacer 106 rigidly attached thereto and against which the side face of pinion gear 101 is clamped. As best shown in FIG. 7A, this subassembly is removable as a unit, as when replacement of any part of the same is desired. Bolts 107 and 108 join the subassembly to the reinforcing block 65 on the end wall 60 of the mixing chamber and in spaced relation thereto in order to provide room for the combined shaft bearing and seal 67 shown in FIG. 8.

Detachably engaged in the member 105 and projecting forwardly therefrom are three chamber-stabilizing pins 109, 110 and 111 having a length sufficient to reach beyond the inner periphery of the ledge 11 of the frame during the travel of mixing chamber from its loading station to its discharge station. Pins 109 and 111, herein defined as the second chamber-stabilizing means, are adapted to slide in contact with the upper surface of the ledge, and pin 110, herein defined as the first chamber-stabilizing means, which is displaced rearwardly from the leading pin 109, is adapted to slide in contact with the lower surface of that ledge. As will be understood, rollers or the like may be employed on these pins to provide a rolling rather than a sliding contact, if so desired. An access opening 112 in the wall 10 (FIG. 1) is provided for use in removing the lower pin 110 when the housing is to be lifted from the frame.

As best seen in FIGS. 2 and 5 an elongated slot 115 is cut from the inner periphery of the ledge 11 adjacent the discharge station of the apparatus, this slot being displaced from the rack 100 in the direction of movement of the housing. With the foregoing in mind, the inverting of the mixing chamber and its restoration to upright position will be apparent from the diagrams shown in FIG. 5. As the chamber, represented by member 105, is carried to the left in the upper diagram by rotation of the housing from which it is suspended, the pins 109 and 110 enter the slot 115 as the first tooth of pinion gear 101 engages the first tooth of the stationary rack 100. This gear engagement then causes the chamber to invert as the pinion gear travels along the rack, and as seen in the central diagram of FIG. 5 the chamber is upside-down and at this time its contents are spilling through the aperture 63 of the chamber wall and into the discharge chute 15 seen in FIG. 4.

As the housing carries the chamber still further to the left, the pinion gear 101 becomes disengaged from the rack and at this time pin 109 comes to rest upon the upper surface of ledge 11 while the trailing lower pin 110 moves through slot 115. Rotation of the chamber is then arrested and it is in upright position ready to receive material at the loading station. As the housing carries the chamber still farther to the left, pin 111 also engages above the ledge 11 and assists pin 110 in preventing counter-rotation of the chamber during loading and during the normal rotation of the mixing blade within the chamber, as now to be described.

For the purpose of effecting an efficient mixing of material within the chamber during the entire period of travel of that chamber from the loading station to the discharge station, there is provided within each chamber a hollow sleeve 120 adapted to be detachably secured to shaft 64 as by a set screw 121 (FIG. 9). A spiral mixing blade having a leading portion 122 of greatest radius merges into a following intermediate portion 123 of somewhat smaller radius which in turn merges into still another following portion 124 of still smaller radius. Rigid spokes 125, 126 and 127 extending between these portions of the blade and the sleeve serve to hold the blade in proper mixing position with respect to the interior surfaces of the chamber. As best shown in FIG. 3, the large leading portion of the blade moves in close proximity to both the end wall 60 of the chamber and the inclined side wall 62 near the junction with that end wall and during rotation with the chamber in upright position will move material uphill along the inclined wall 62 with a tumbling and folding type of agitation. This material is progressively fed to the intermediate portion 123 of the blade and then to the portion 124. During this movement under action of the rotating mixing blade the material moreover is tending to slide down the inclined wall 62 of the chamber under the influence of gravity. This sliding action preferably is aided by means of a reversely directed blade extension 128 disposed adjacent the end wall 61 of the chamber and having a spoke 129 extending to the sleeve.

For example, it has been found that in the mixing of certain materials the lighter weight and smaller sized particulate matter tends to compact against the end wall 61 and by using the blade extension 128 such material is positively dislodged and returned to the main body of material. Moreover, when the chamber begins its rotation at the start of the discharge operation the extension 128 serves to force material toward the discharge aperture 63 and to clean the chamber region adjacent end wall 61. The larger portions 122 and 123 of the blade can move through aperture 63 during the mixing action and, indeed, when a compact apparatus is desired, the largest blade portion 122 may move through the aperture 23 in the upper portion of the bridging housing plate 30.

As will be seen, the upper edge of end wall 60 of the chamber lies a substantial distance above the axis of shaft 64 and splashing of material from the chamber due to blade rotation is largely prevented due to the confining nature of the walls of the chamber upon the material. The direction of rotation of the shaft 64, moreover, is opposite to the direction of turning of the chamber upon that shaft when pinion 101 engages with rack 100. When portions of the blade touches interior surfaces of the chamber or when material bridges the distance between the blade edges and such interior surfaces a snubbing action to the free turning of the chamber is present and thus the impact of the pin 109 upon shelf 11 as the chamber reaches upright position, is diminished.

Referring now to FIG. 4, the stationary frame in the region of the discharge station is provided with a downwardly inclined floor plate 132 projecting through an opening 133 in the floor plate 12 of the frame. This inclined member is fastened at its edges to the confronting surfaces of the webs 20 and 22 of the frame and triangular exterior side walls 134 and 135 beneath the floor plate 12 serve to help define the chute 15 through which material is discharged from the apparatus. Accordingly, material dropping from an inverted chamber is confined by webs 20 and 22 and by the inner surface of the circular wall 10 and slides through the opening 133 into that chute. Moreover, when the chamber is inverted at this discharge station the plate 132 is generally parallel to the adjacent side wall of that inverted chamber.

Having thus described the details of the movable and stationary portions of one form of apparatus employing the invention, a typical operation of the apparatus may be carried out as follows. Upon start-up with all mixing chambers empty, the operator energizes motor 80 which through shaft 46 causes the housing to rotate at a prescribed speed which may be governed by any suitable motor control means (not shown).

Thereafter, motor 84 is energized to cause each of the shafts 64 of the several chambers to start turning at the desired speed and this motor speed likewise is governed by a separate motor control means, not shown. When the housing is rotating at the desired speed depending upon the throughput and the degree of mixing required of the particular material being processed, the first of the empty chamber 99E while positioned below the filling apparatus shown in FIG. 1 is filled with materials. Any conventional overhead filling apparatus forming no part of the present invention may be employed as, for example, a structure embodying bins 140 emptying into a weighing hopper 141 and thence into a funnel 142 which drops the material through opening 31 of the housing. Apparatus of this type is adapted to handle a charge of materials in a matter of seconds and since the housing rotates at a slow speed the chamber 99E (FIG. 2) at the filling station is loaded quickly, it being understood that the shaft 64 within that chamber is then rotating. At this same time the next following chamber 99D is in its inverted position above the discharge chute 15. Continued rotation of the housing then brings chamber 99D to upright position when it reaches the filling station whereupon it too is loaded, the remaining chambers seriatim following a similar procedure.

The mixing within the other chambers is in no way modified by the filling and the discharging taking place in the two thus described chambers.

When it is desired to disassemble the apparatus, the pins 110 are removed from the chamber-positioning member 105 through access opening 112 and then by removing the key 47 from shaft 46 the entire housing and its suspended chambers can be lifted from the stationary frame. By removing pin 69 from the pinion gear 70 and the pin 171 from the sleeve 120, the mixer shaft 64 may then be detached after which the mixing chamber itself can be detached from the housing.

Shrouds, screens or other protective devices (not shown) may surround the rotatable housing to prevent obstructions from becoming engaged with the rollers 75 on the ledge 11 or with the portions 122 of the mixing blades which extend through the filling openings of the housing.

While we have described and illustrated certain specific embodiments of our invention, it will be apparent that numerous changes and modifications may be made therein and it is intended by the appended claims to cover all such changes and modifications as fall within the true scope and spirit of the invention.

What we claim as new and desire to secure by Letters Patent of the United States, is

1. Mixing apparatus comprising a stationary frame, a generally circular housing rotatably mounted upon and supported by said frame, means for rotating said housing, said housing during its movement passing in sequence over a discharge station and beneath a loading station, a plurality of invertible mixing chambers mounted within said housing and movable therewith, each of said chambers having an opening in a wall thereof for receiving and for discharging material, means for inverting said chambers seriatum at said discharge station and for restoring the same to upright position at said loading station, means within said chambers for mixing material contained therein, and means for driving said mixing means.

2. Apparatus as defined in claim 1 wherein said mixing chambers have generally truncated conical shapes and are arranged symmetrically with respect to the axis of rotation of said housing.

3. Mixing apparatus comprising a stationary frame having a generally circular upper portion with a plurality of radial upstanding reinforcing webs contained therein, a generally circular housing rotatably mounted upon and supported by said frame means for rotating said housing, said housing during its movement passing in sequence over a discharge station disposed between a pair of adjacent webs and then beneath a loading station, a plurality of invertible mixing chambers of generally truncated conical shapes mounted within said housing and movable therewith, the side walls of said chambers being closely spaced with respect to each other and with respect to the upper edges of said webs thereby to form a compact high-capacity mixing apparatus, each of said chambers having an opening in a side wall thereof for receiving and for discharging material, means for inverting said chambers seriatum at said discharge station and for restoring the same to upright position at said loading station, means within said chambers for mixing material contained therein, and means for driving said mixing means.

4. Apparatus as defined in claim 3 including a discharge chute extending outwardly of said frame and communicating with the space within said frame defined by said pair of adjacent webs, the floor of said chute comprising an upwardly inclined plate arranged generally parallel to the adjacent side wall of the chamber inverted thereabove at said discharge station.

5. In a mixing apparatus, the combination comprising a stationary frame having a generally horizontal circular ledge at an upper portion thereof, a rotatable housing having an upper bridge portion, a central mixer-shaft hanger suspended from said bridge portion adjacent the axis of rotation of said housing, an outer mixer-shaft hanger suspended from said bridge portion adjacent the periphery of said housing, a plurality of mixing chambers, each chamber having a mixing shaft extending axially therethrough and rotatably supported adjacent its respective ends in the respective hangers, said chambers being symmetrically arranged about the axis of rotation of said housing and having their weight supported by the shafts passing therethrough thus to cause the weight of said chambers and their contents to be suspended from the bridge portion of said housing, a wheel rotatably mounted upon each of said mixer shafts adjacent the outer ends of said shafts and bearing against said ledge thereby to support the housing and its attached parts, means for rotating said housing, and means for simultaneously rotating each of said mixer shafts within said chambers and independently of movement of said housing.

6. Apparatus as defined in claim 5 wherein said housing includes apertures in an upper surface thereof through which apertures material may be passed into said chambers, while said housing is rotating.

7. Apparatus as defined in claim 5 wherein said means for rotating said mixer shafts includes a shaft rotatably supported on said frame beneath said central hanger and carrying a driving gear at its upper end, each of said mixer shafts having a pinion gear at its inner end and engaged with said driving gear.

8. Apparatus as defined in claim 7 wherein said shaft means for rotating said mixer shafts comprises a hollow shaft, and said means for rotating said housing comprises a shaft journalled within said hollow shaft and attached at its upper end to said housing above said driving gear.

9. In a mixing apparatus, the combination comprising a stationary frame having a generally horizontal circular ledge at an upper portion thereof, a rotatable housing having an upper bridge portion, a central mixer-shaft hanger suspended from said bridge portion adjacent the axis of rotation of said housing, an outer mixer-shaft hanger suspended from said bridge portion adjacent the periphery of said housing, a plurality of invertible mixing chambers having a normally upwardly facing opening in a side wall thereof, each chamber having a mixing shaft extending axially therethrough and rotatably supported adjacent its respective ends in the respective hangers, said chambers being symmetrically arranged around the axis of rotation of said housing and being mounted for rotation about their respective mixer shafts, a wheel rotatably mounted upon each of said mixer shafts adjacent the outer ends of said shafts and bearing upon said ledge, means for rotating said housing, means for simultaneously rotating each of said mixer shafts within the chambers and independently of movement of said housing, a first chamber-inverting means mounted on said frame adjacent a discharge station for said chambers, a second chamber-inverting means rigidly attached to each of said chambers and engageable with said first chamber-inverting means as said chambers are respectively carried to said housing past said discharge station thereby to turn said chambers through one complete revolution about said mixer shafts at said discharge station and to leave said chambers with the opening thereof in its normal position following disengagement of said first and said second chamber-inverting means from each other.

10. Apparatus as defined in claim 9 wherein said first chamber-inverting means comprises a rack and said second chamber-inverting means comprises a pinion gear engageable with said rack.

11. Apparatus as defined in claim 9 and including a chamber-stabilizing means attached to the respective chambers and adapted to contact the lower surface of said ledge during movement of said chambers from one discharge position to the next successive discharge position thereby to assist in holding said chambers against rotation on their mixer shafts except at the time of discharge therefrom.

12. Apparatus as defined in claim 11 wherein said chamber-stabilizing means is detachable from said chamber and said housing is detachable from said housing-rotating means thereby to permit raising of said housing and its attached chambers upwardly from engagement with said frame.

13. Apparatus as defined in claim 9 and including a chamber-stabilizing means attached to the respective chambers and adapted to contact the upper surface of said ledge during movement of said chambers from one discharge position to the next successive discharge position thereby to assist in holding said chambers against rotation on their mixer shafts except at the time of discharge therefrom.

14. Apparatus as defined in claim 9 and including a first chamber-stabilizing means and a second chamber-stabilizing means each of which is attached to the respective chambers and adapted to contact the respective lower and upper surfaces of said ledge during movement of said chambers from one discharge position to the next successive discharge position thereby jointly to assist in holding said chambers against rotation on their mixer shafts except at the time of discharge therefrom.

15. In a mixing apparatus of the type described, a mixing chamber of generally truncated conical form having an apertured first end wall, and an apertured second end wall and an arcuate side wall, a shaft bearing in the respective apertures of said end walls, a rotatable shaft extending axially of said chamber and journalled for rotation in the respective shaft bearings, said arcuate side wall having an opening therein for receiving material when said chamber is in upright position and for discharging material when said chamber is in inverted position, and means rigidly attached to said first end wall and adapted to rotate said chamber about said shaft through one complete revolution during the discharging of material therefrom.

16. A mixing chamber as defined in claim 15 wherein one edge of said opening is defined by said first end wall and the entire opening is located a substantial distance above the axis of said shaft while said chamber is occupying its upright position.

17. A mixing chamber as defined in claim 15 including a generally spiral mixing blade affixed to said shaft within said chamber and movable into close proximity to the inner surfaces of the respective walls of said chamber during rotation of said shaft.

18. A mixing chamber as defined in claim 17 wherein at least a portion of said blade projects through said opening in said side wall during the mixing of material in said chamber.

19. A mixing chamber as defined in claim 17 wherein said blade includes an extension disposed adjacent the second end wall and directed toward the first end wall of said chamber and serving to move material toward said opening when said chamber is in its inverted position.

20. A mixing chamber as defined in claim 15 wherein the direction of rotation of said shaft is opposite to the direction of rotation of said chamber about said shaft.

21. Mixing apparatus comprising a stationary frame, a generally circular housing rotatably mounted upon said frame and supported by said frame, means for rotating said housing, a plurality of mixing chambers mounted within said housing and movable therewith, means for loading material into said chambers in sequence, means for discharging material from said chambers in sequence, means including a shaft within each of said chambers for mixing material contained therein, means for driving said shafts, and wheel means mounted on each of said shafts and bearing upon said frame thereby to support said housing on said frame.

22. The method of mixing material which comprises, sequentially loading a batch of material into each of a series of separate discrete mixing chambers as the chambers move past a loading station, continuously moving said chambers through an orbital path of movement from the loading station to an unloading station, mixing the material contained within each of said chambers as the chambers move through said orbital path of movement, and sequentially unloading said mixed materials from each of said chambers at an unloading station as the chambers move past the unloading station and while the chambers continue to move in said orbital path of movement.

23. The method of mixing concrete material which comprises, sequentially loading a batch of concrete mix material into each of a series of separate discrete mixing chambers as the chambers move past a loading station, continuously moving said chambers through an orbital path of movement from the loading station to an unloading station, mixing the material contained within each of said chambers by moving the material uphill to effect a tumbling and folding type of agitation as the chambers move through said orbital path of movement, and sequentially unloading said mixed concrete from each of said chambers at an unloading station as the chambers move past the unloading station and while the chambers continue to move in said orbital path of movement.

24. Mixing apparatus comprising a stationary frame, a housing mounted upon and supported by said frame, said housing being movable along a continuous curvilinear path, means for continuously moving said housing along said curvilinear path, a plurality of mixing chambers mounted upon said housing and movable therewith, said chambers during their movement passing in sequence over a discharge station and beneath a loading station, each of said chambers having at least one opening in a wall thereof for receiving and discharging material, means for emptying said chambers seriatim as said chambers pass said discharge station, each of said chambers having a generally truncated conical bottom surface, material agitating means within each of said chambers for mixing material contained therein by moving the material contained within said chambers upwardly along said truncated bottom surface of said chambers and allowing it to fall rearwardly over said agitating means, and means for driving said agitating means.

References Cited by the Examiner

UNITED STATES PATENTS

| | | | |
|---|---|---|---|
| 2,482,324 | 9/1949 | Dachkevitch | 259—161 |
| 2,984,461 | 5/1961 | Butler | 259—161 |
| 3,128,997 | 4/1964 | Young | 259—161 |

FOREIGN PATENTS 996,779  9/1951  France.

WALTER A. SCHEEL, *Primary Examiner.*
R. W. JENKINS, *Assistant Examiner.*